UNITED STATES PATENT OFFICE.

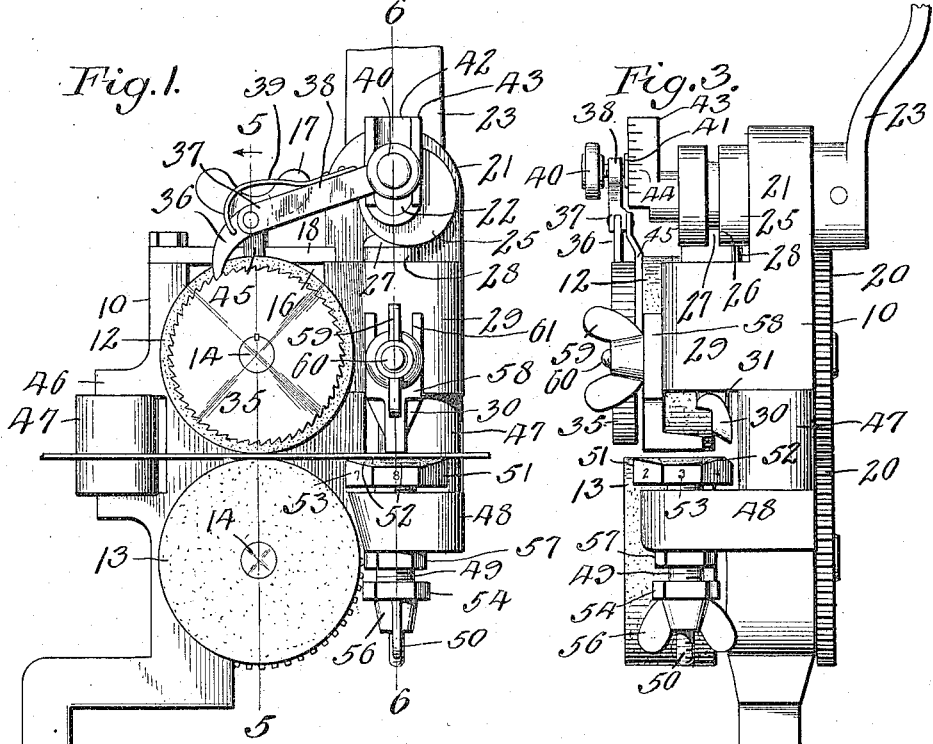

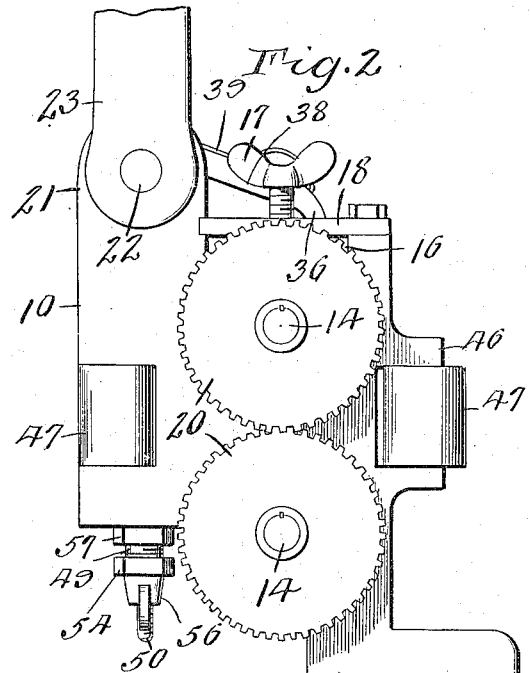
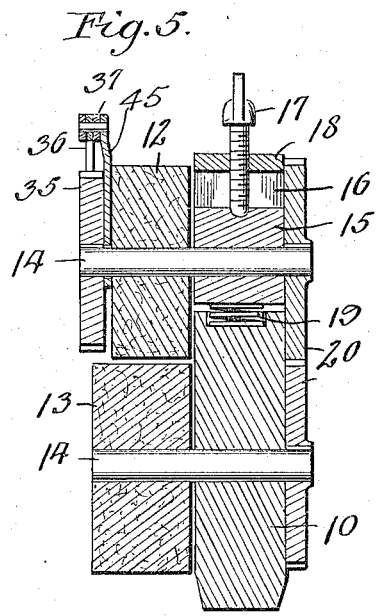
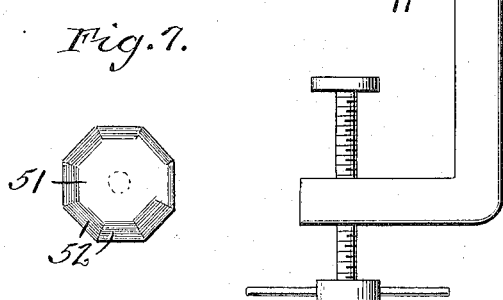
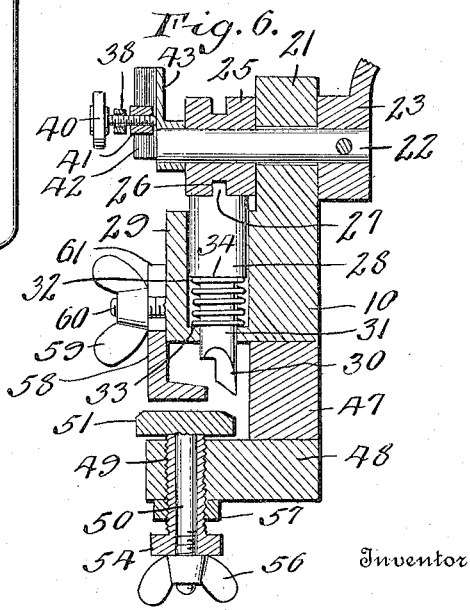
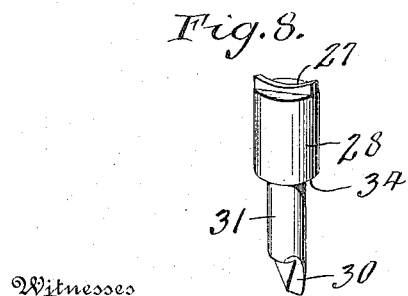

TILLMAN B. WORTHINGTON, OF SCOTLAND, PENNSYLVANIA.

SAW-SET.

1,152,256.  Specification of Letters Patent.  Patented Aug. 31, 1915.

Application filed July 15, 1914. Serial No. 851,137.

*To all whom it may concern:*

Be it known that I, TILLMAN B. WORTHINGTON, a citizen of the United States, residing at Scotland, in the county of Franklin and State of Pennsylvania, have invented new and useful Improvements in Saw-Sets, of which the following is a specification.

The invention relates to saw sets, and more particularly to the class of hand driven automatic saw sets.

The primary object of the invention is the provision of a saw set of this character wherein the feed of the saw blade is automatically controlled so that the desired number of teeth will be automatically set during the operation, thereby obviating the hand adjustment of the saw blade, thus insuring accuracy and uniformity in the setting of the teeth thereby.

Another object of the invention is the provision of a saw set of this character which can be readily clamped to a support and the feed of the saw blade regulated with accuracy so that it will be automatically adjusted in position for the setting of the teeth thereon, the feed mechanism and the control thereof being of novel form to insure positiveness and accuracy in the working of the saw set.

A further object of the invention is the provision of a saw set wherein the anvil can be adjusted and is formed with a series of angular faces to insure the correct setting or pointing of the teeth of the saw blade under the action of the plunger or hammer, which is automatically driven when the saw set is actuated by hand.

A further object of the invention is the provision of a saw set wherein the anvil for coöperation with the plunger or hammer can be vertically adjusted and rotated to bring any one of its respective angular faces in proper position to angularly set the saw tooth to the desired degree, thus the teeth of the saw blade can be set uniformly and with accuracy on the adjustment of the anvil with relation to the setting plunger or hammer.

A still further object of the invention is the provision of a saw set of this character wherein the same can be readily and quickly clamped to a support such as a bench or table and is capable of easy operation for the automatic setting of the saw teeth.

A still further object of the invention is the provision of a saw set of this character which is extremely simple in construction, reliable and efficient in operation, strong, durable, and inexpensive in manufacture.

With these and other objects in view, the invention consists in the construction, combination and arrangement of parts as will be hereinafter fully described, illustrated in the accompanying drawings, and pointed out in the claims hereunto appended.

In the drawings:—Figure 1 is a side elevation of a saw set constructed in accordance with the invention. Fig. 2 is a similar view, looking toward the opposite side of the saw set. Fig. 3 is a vertical edge elevation. Fig. 4 is a top plan view. Fig. 5 is a sectional view on the line 5—5 of Fig. 1. Fig. 6 is a fragmentary sectional view on the line 6—6 of Fig. 1. Fig. 7 is a top plan view of the adjustable anvil. Fig. 8 is a perspective view of the saw setting plunger or hammer.

Similar reference characters indicate corresponding parts throughout the several views in the drawings.

Referring to the drawings in detail, the saw set comprises a frame 10 provided with a clamp 11 which may be of any suitable form to fasten the frame upon a support when the saw set is to be used. Arranged at one side of the frame are upper and lower rollers 12 and 13, respectively, the same being fixed to shafts 14, the lowermost one of which is journaled in the frame, while the uppermost shaft is journaled in a slide bearing 15 mounted in a guideway 16 formed in the said frame, the roller 12 being automatically driven, while the roller 13 serves as a guide roller for a saw blade when inserted between both rollers. The bearing 15 is adjusted through the medium of an adjusting screw 17 threaded in a bridge plate 18 secured to the frame and lying across the guideway 16.

Interposed between the bearing 15 and the inner closed end of the guideway 16 is a coiled expansion spring 19 which serves to hold the bearing 15 against the inner end of the screw 17 so that on the adjustment of the latter the feed roller 12 will be moved toward or away from the guide roller 13, the said rollers 12 and 13 being designed to frictionally engage the opposite faces of the saw blade when inserted therein, while the roller 12 controls the feed of the saw blade and is automatically rotated in a manner presently described.

Fixed to the shafts 14 on the side of the frame 10 opposite the rollers 12 and 13 carried by said shafts are meshing gears 20, so that both rollers 12 and 13 will be positively driven to serve as companion feed rollers for the saw blades when inserted therebetween.

Rising from the frame is a bearing 21 in which is journaled a driving shaft 22 to which is fixed a handle crank 23 provided with the usual handle 24, and this shaft also carries an eccentric 25 formed with a peripheral groove 26 into which projects a guide rib 27 formed on the upper end of a plunger 28, the same slidably fitting in a sleeve 29 formed on the frame 10 at one side of the upper roller 12, the plunger being formed with a beveled outwardly tapered saw setting tip 30 which acts upon the teeth of the saw for the bending thereof for the setting of the same in a manner presently described.

The plunger 28 has a reduced portion 31 which is surrounded by a coiled tension spring 32, the same being contained within the sleeve 29 and having one end resting against an annular shoulder 33 formed therein, while its opposite end works against the shoulder 34 on the plunger formed by the reduced portion 31 thereof, the spring being designed to lift the plunger and hold it in working relation to the eccentric 25 when the shaft 22 is being rotated by hand.

Keyed or otherwise fixed to the shaft 14 carrying the roller 12 and spaced therefrom is a ratchet wheel 35 with which engages a ratchet dog or pawl 36, the same being pivotally connected in the forked end 37 of an arm 38, the pawl or dog being acted upon through the medium of a spring 39 to permit the same to ride over the teeth of the ratchet wheel 35 on the throw of the arm in one direction and to engage any one of the teeth on the ratchet wheel when the arm is thrown in the opposite direction, the spring 39 being mounted upon the said arm 38, which has loosely passed through its opposite end a binding screw 40 threaded in a wedge-shaped adjustable block 41 fitted within a correspondingly shaped groove 42 formed in a crank 43 mounted on the shaft 22, the block 41 when adjusted in the groove 42 being designed to regulate the throw of the arm 38 so as to vary the feed of the saw blade under the intermittent rotation of the rollers 12 and 13, which automatically feed the said saw blade intermittently, the roller 12 being directly driven from the shaft 22 when rotated. The crank 43 is formed with a graduated scale face 44, while the block 41 is provided with a suitable pointer adapted to coöperate with the scale face for permitting the accurate adjustment of the block in the groove 42 to regulate the throw of the arm 38 which controls the intermittent feed or rotation of the rollers 12 and 13 during the operation of the saw set.

Loosely connected to the shaft 14 carrying the roller 12 and disposed between the latter and the ratchet wheel 35 is a guide arm 45, which is connected with the pivot of the ratchet pawl or dog 36 so as to hold the latter and the arm 38 in working relation to the ratchet wheel 35 for the intermittent rotation thereof. Formed at opposite longer edges of the frame 10 are spaced bearing ears 46, between which are mounted rotatable gauge or guide rollers 47, against which work the teeth of the saw blade when being automatically fed by the rollers 12 and 13 so as to bring the teeth into position to be acted upon by the tip 30 for the angular setting of the teeth of the saw blade.

Integrally formed with the frame 10 below the sleeve 29 is a lateral offset 48 forming a bearing in which is threaded a vertically adjustable sleeve 49 receiving the stem or post 50 of an anvil 51 formed with a plurality of setting faces 52, each having an inclination varying with respect to the others so that the teeth of the saw can be angularly set at different angular degrees when the anvil has been adjusted to have one of its setting faces coöperate with the tip 30 on the plunger. The anvil 51 is of octagonal shape and has on its respective peripheral faces suitable scales as at 53 to enable the proper setting of the anvil when it is desired to set the teeth of the saw blade at a predetermined angle. The sleeve is formed with a peripheral knurled head 54 so that the anvil can be manually adjusted, while threaded on the stem or post 50 of the said anvil is a winged nut 56 which permits the locking of the anvil in its adjusted position after being rotated to bring the particular setting face 52 in companion relation to the tip 30 of the plunger 28, the sleeve 49 being designed to vertically adjust the anvil and carrying a lock nut 51 so that it may be locked in its adjusted position.

Adjustably connected to the sleeve 29 integral with the frame 10 is a gage foot 58, the latter being locked in its adjusted position through the medium of a winged nut 59 threaded on a lug 60 projecting from the sleeve, the shank of the foot 58 being provided with a slot 61 through which projects the lug 60 and allows a limited degree of adjustment of the foot. This foot 58 also steadies and guides the tooth of the saw on the anvil 51 during the automatic feeding of the saw blade in the saw set. It is of course understood that the saw blade is reversed after being automatically fed between the rollers in one direction so that the alternate teeth of the saw will be properly set at the desired angle, the saw set being designed to operate upon band or hand saws of the usual well-known type.

From the foregoing description, taken in connection with the accompanying drawings, it is thought that the construction and manner of operation of the device will be clearly understood, and therefore a more extended explanation has been omitted.

What is claimed is:—

1. In a saw set, a frame, an offset bearing on said frame, a sleeve adjustably threaded in said bearing, an anvil having a stem passed through the sleeve and also having a plurality of setting faces at different angular inclinations relative to each other, means engageable with the stem for locking the same in the sleeve, and saw setting mechanism coöperative with the said anvil and supported by the frame.

2. In a saw set, a frame, an offset bearing on said frame, a sleeve adjustably threaded in said bearing, an anvil having a stem passed through the sleeve and also having a plurality of setting faces at different angular inclinations relative to each other, means engageable with the stem for locking the same in the sleeve, saw setting mechanism coöperative with the said anvil and supported by the frame, and means operative by said mechanism for intermittently feeding a saw between the said mechanism and the anvil.

3. In a saw set, a frame, an offset bearing on said frame, a sleeve adjustably threaded in said bearing, an anvil having a stem passed through the sleeve and also having a plurality of setting faces at different angular inclinations relative to each other, means engageable with the stem for locking the same in the sleeve, saw setting mechanism coöperative with the said anvil and supported by the frame, means operative by said mechanism for intermittently feeding a saw between the said mechanism and the anvil, and guide rollers journaled in the frame and traversable over the heel edge of said saw for guiding it to the saw setting mechanism.

In testimony whereof I affix my signature in presence of two witnesses.

TILLMAN B. WORTHINGTON.

Witnesses:
HELEN F. MADDOX,
BENNETT S. JONES.

Copies of this patent may be obtained for five cents each, by addressing the "Commissioner of Patents, Washington, D. C."